Jan. 29, 1963 H. MELLE 3,075,440
PHOTOGRAPHIC CAMERA WITH EXPOSURE METER PHOTOCELL
ADJUSTABLE FOR DISCRETE SCANNING
Original Filed Oct. 16, 1956 3 Sheets-Sheet 1

INVENTOR
HEINZ MELLE
BY
Blum, Moscovitz,
Friedman & Blum

ATTORNEYS.

Jan. 29, 1963 H. MELLE 3,075,440
PHOTOGRAPHIC CAMERA WITH EXPOSURE METER PHOTOCELL
ADJUSTABLE FOR DISCRETE SCANNING
Original Filed Oct. 16, 1956 3 Sheets-Sheet 2

INVENTOR
HEINZ MELLE
BY
Blum, Moscovitz,
Friedman and Blum

ATTORNEYS.

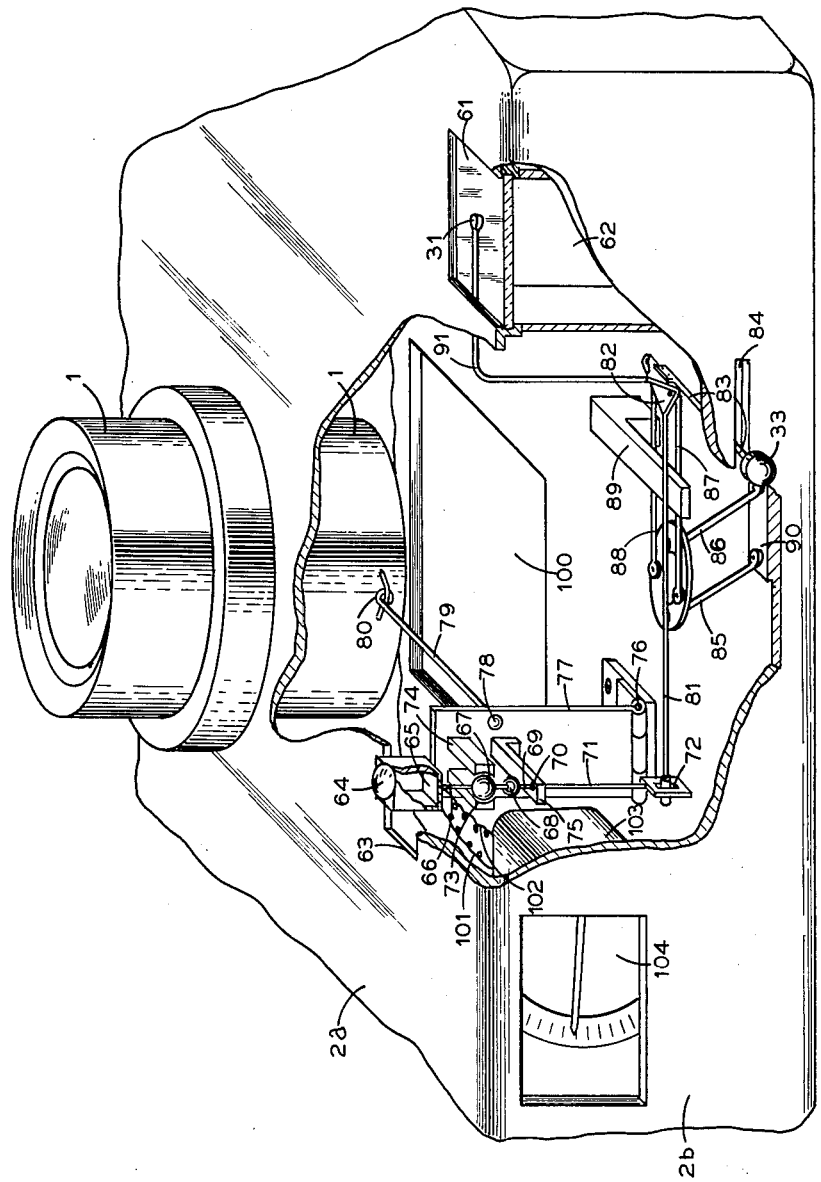

United States Patent Office 3,075,440
Patented Jan. 29, 1963

3,075,440
PHOTOGRAPHIC CAMERA WITH EXPOSURE METER PHOTOCELL ADJUSTABLE FOR DISCRETE SCANNING
Heinz Melle, Braunschweig, Germany, assignor to Voigtlander, A.G., Braunschweig, Germany, a corporation of Germany
Original application Oct. 16, 1956, Ser. No. 616,247, now Patent No. 3,007,381, dated Nov. 7, 1961. Divided and this application Sept. 1, 1961, Ser. No. 135,601
12 Claims. (Cl. 95—10)

This invention relates to photographic cameras provided with exposure meters and, more particularly, to cameras of this type in which certain disadvantages of the arrangements hitherto used are reduced or eliminated. The present application is a division of my copending application Serial No. 616,247, filed October 16, 1956, now Patent No. 3,007,381, issued November 7, 1961.

Cameras embodying the present invention are preferably provided with built-in exposure meters, and it is fundamentally immaterial what type of exposure meter is used, so that either optical or photo-electric meters are useable. However, as photo-electric exposure meters are being ever more widely used in practice, due to the objectivity of their light measurements, they are preferred to optical exposure meters. Accordingly, in the following description, the primary emphasis will be placed on arrangements in which the light measurement is effected by means of a photo-electric cell having an electrical indicating instrument connected to its output.

Exposure meters integrate the various luminous flux densities of the field of the object, and thus indicate an average value of illumination. However, knowledge of such average value often is not sufficient for successful exposure of the negative material. As a result, manufacturers of exposure meters have suggested to users thereof the application of corrective factors based on empirical observations, the particular factors suggested for each case being in accordance with the conditions prevailing in such case. It will be appreciated that such expedients are not a satisfactory solution of the problem of obtaining correct exposure values, and thus are not capable of obviating defective exposures.

In the usual use of conventional exposure meters, the illumination measured by the exposure meter is not the same as that acting on the photo-sensitive film through the objective of the camera. There are several reasons for this, which are explained in more detail below.

The electric current outputs of photocells, as a result of and corresponding to light incident on the cells, are very small, so that, particularly with lower light intensities, the pointer deflections of the measuring instrument are not exactly defined and are not clearly readable. To avoid this difficulty, it has been proposed to use photocells having relatively large light exposed surfaces, but arrangements of this type find only limited use where the exposure meters are built-in into cameras as, in view of dimensional limitations of the cameras, only a small free space is available for mounting of a photocell. As a result, resort has been had to an expedient wherein the light incident upon the photocell was made to be incident over a relatively large solid angle thereon. Thus, photographic cameras have been provided wherein the solid angle of the light incident on the electric exposure meter is even larger than the solid angular field of the camera objective.

The use of such wide angle exposure meters results in larger current outputs from the photocells with consequently greater pointer deflections for a given intensity of incident light. However, with such arrangement it is possible, or even probable, that the indicated light intensity does not correspond to the actual value of light intensity available for exposure of the film. Thus, if the exposure value setting of the camera is based upon the light value as measured by the exposure meter, a defective exposure may result, even in those cases in which the aforementioned empirical corrective factors have been taken into consideration. The reason for this is that such factors are based merely on probability calculations and are correctly understood by layman only infrequently.

Such measurements of the light values by exposure meters are basically wrong because the light values measured thereby are determined on the basis of a cone of light rays which is different from that incident upon the film to be exposed. If the solid angle of the light incident on the photocell is equal to that incident through the objective on the film or other negative material, improved results are obtained. However, even under such conditions, defective exposures can result, as will be apparent from general considerations of geometric optics.

The present invention is directed to exposure meter arrangements wherein the aforementioned disadvantages and difficulties of the prior art are obviated.

For an understanding of the principles of the invention, reference is made to the following description of typical embodiments thereof as illustrated in the accompanying drawings. In the drawings:

FIG. 8 is a perspective view, partly broken away, of a preferred embodiment of the invention.

Figure 1:
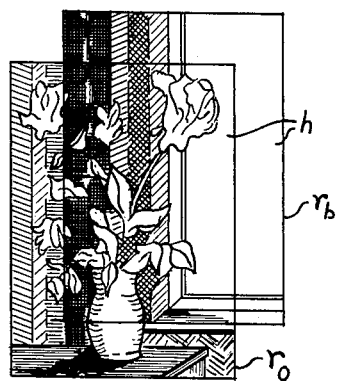
FIGS. 1 and 2 are somewhat diagrammatic illustrations showing the adverse effects which may occur when using an exposure meter in the conventional manner.
Figure 2:
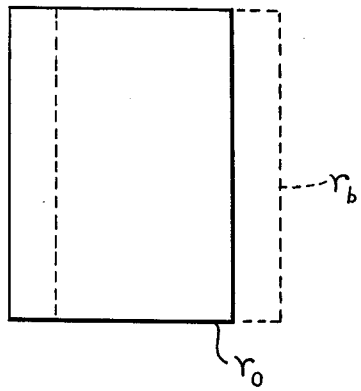

Referring to the drawings, FIGS. 1 and 2 illustrate how a defective measurement of the available light values can actually impair an exposure. Within the object field of the camera objective, which is indicated as limited by the frame $r_o$, a bunch of flowers is placed on top of a table which has a relatively low illumination. The illumination on the flowers is at a relatively low level due to the flowers being arranged in front of relatively dark wallpaper. This objective field is assumed to have a light value "7." If, however, the built-in exposure meter measures the light values of the field defined by the frame $r_b$, due to the presence of the bright surface $h$, representing, for example, a window occupying about one-half of the field $r_b$, the exposure meter will indicate a considerably higher light value, for example, the light value "11." Such differences between the average light density of the field measured by the camera objective and that of the field included by the exposure meter, and which, in the illustrated example, amounts up to about four light value units, occur in practice not infrequently. Under extreme conditions, the differences can be even higher. Such defective measurements not only can adversely affect color photography, but also can adversely affect black and white photography. If the plane at which the rays of light entering the objective are assumed to come to a point is made coincident with the plane in which the rays of light incident upon the photoelectric cell of the exposure meter are assumed to come to a point, the defect is not corrected and the two frames $r_o$ and $r_b$, indicating the respective fields, are still off-set as best seen in FIG. 2.

In order to avoid these disadvantages, the present invention provides an arrangement wherein the light responsive component of the exposure meter is mounted in the camera for swinging about an axis fixed relative to the camera, and in accordance with the sharp focusing of the camera objective. While, as stated, the type of light responsive component is immaterial, the camera is preferably provided with a photoelectric exposure meter. For the purpose of simplifying the disclosure of the invention, the electrical indicator and its circuit connections with the photo-electric cell have not been shown in all the FIGURES of the drawings. Also, any suitable measuring and indicating mechanism can be used and, if amplifying devices are necessary between the photoelectric cell and the electrical indicator, these may be provided although they have not been shown in the drawings. For the sake of compactness, such amplifying devices would preferably constitute transistor amplifiers.

In accordance with the present invention, the light responsive component of the exposure meter is swung, during measurement of the light, in such a manner that the altitude of the cone of light rays incident thereupon intersects the optical axis of the camera objective in the plane of the object to be photographed. The objective and the photo cell have solid angles of incident light which are equal and whose vertices lie in the same plane.

The electrical indicator component of the exposure meter can be arranged in any desired manner upon or within the camera casing, and the light responsive component of the exposure meter can be arranged on or in the front wall of the camera. It has been found to be desirable so to arrange the swingable light responsive component in a manner such that its point of symmetry, which is decisive for the incidence of light, is located on a straight line extending parallel to a pair of limiting lines of the image field, which latter is assumed to be rectangular, and further extends at approximately the level of the axis of the camera objective.

Figure 4:
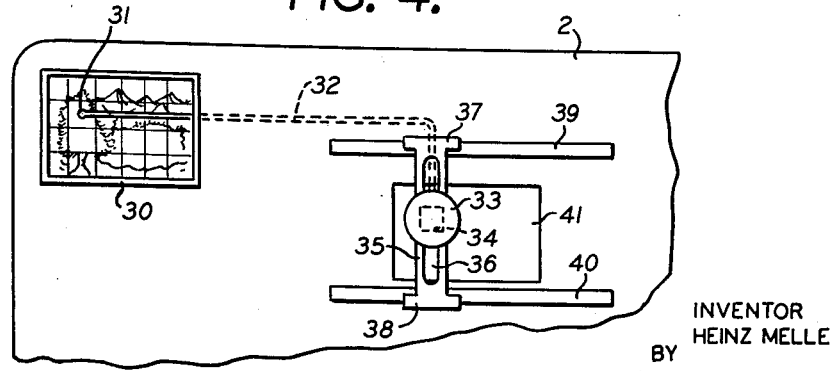
FIG. 4 is a somewhat diagrammatic elevational view illustrating one embodiment of a photo-electric cell mounting arrangement in accordance with the invention.

In further accordance with the invention, manual adjustment of the photocell to obtain the above results can be eliminated by coupling the photocell with the sharp focusing means of the camera objective. As a result, by operation of such sharp focusing means, both the camera objective and the exposure meter will be set automatically to the same picture-taking distance, and will be centered on the same object plane. An arrangement of this type is illustrated in FIG. 4 of my said copending application Serial No. 616,247, now U.S. Patent No. 3,007,381, and forms the subject matter of such patent.

The aforementioned features represent essential features of the invention, and it should be noted that the suggested solid or included angle of incident light for the photocell provides sufficient light to the photocell for developing output currents sufficiently large for proper indication without the use of amplification, even if the included angle is similar to the incident light angle of the camera objective. Consequently, the principles of the present invention can be applied to any camera without the necessity of additional expenditure, and will result in a noticeable improvement in the performance of the camera.

While, by using the above-described improvements, defective light measurements can be eliminated in many cases, in some cases occurring in practice these improvements still do not provide an entirely satisfactory measurement of the light for reasons which will now be explained.

Normally, a picture is composed of various brightness values which differ from each other, and differences in brightness and contrast are essential for a successful exposure. As previously mentioned, the exposure meter indicates an average value derived from all of the brightness values of the picture. It will be appreciated that the various brightness values are not necessarily of equal importance for the picture. Thus, the foreground may be of more interest to the photographer than is the background, and a near group of trees may be of more interest than a distant forest or vice versa. For example, if a picture of a person is to be taken from a short distance, and possibly even against the light, as against a bright summer sky as the background, the exposure of the negative material, if based on the indication of the exposure meter, will result in under exposure with respect to the person. The picture will not be satisfactory because its main subject, which is the person, will appear unnaturaly dark or even as a silhouette. A defective picture is similarly obtained in the opposite case, wherein over exposure of the most important part of the picture is obtained if the picture of a bright object is taken against an extensive dark background and in accordance with the indication of the exposure meter.

In view of the practical experience that, in using the conventional method of measuring the illumination or light with conventional commercial exposure meters, too large an image angle is included, it has been suggested to provide a light incidence angle relative to the photocell of only about one-tenth the value of the light incidence angle entering through the camera objective. According to this suggestion, the light incidence angle of the photocell should be smaller than the average photographic objective. The reduction in output current of the photocell, caused by the reduction of light due to the decrease in the light incidence angle, can be compensated by electrical amplification, for example. However, this suggestion does not satisfactorily solve the problem of always providing a correct measurement of light. It is true that the built-in photocell of the camera, and which, in accordance with such suggestion, has a small light incidence angle, will measure light originating from some part of the object to be photographed. However, there is no guarantee that the incident light to be measured will always originate from the selected main part of the object whose picture is to be taken.

The difficulty in obtaining correct measurement of the light by means of photocells having small incident light angles is solved by the present invention in a simple and reliable manner, utilizing a pivoting or swinging mounting for the photocell. The swingable or pivotal mountings for photocells having a small angle of incident light are, in principle, the same as in the case of photocells having a large angle of incident light, and particularly photocells having a solid angle of incident light which is substantially equal to that of the picture-taking objective.

Figure 3:
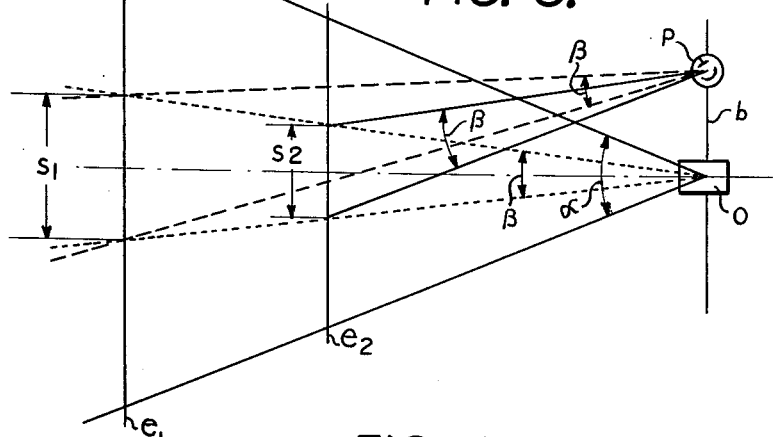
FIG. 3 is a diagrammatic illustration of the light ray cones of a camera objective and of an associated photoelectric cell, when the objective and the photo-electric cell are coordinated in accordance with the principles of the invention.

Referring to FIG. 3, a camera objective $o$, having an image angle $\alpha$, and a photocell $p$, having an incident light solid angle $\beta$, are arranged in a common plane $b$ including the vertices of the image angle and the incident light angle. If the objective $o$ is sharply focused to the object plane $e_2$, and if, for example, the most important part of the picture is in the center of this object plane, the photocell $p$ should be adjusted in such a manner that the altitude of its incident light cone or pyramid intersects the optical axis of objective $o$, in object plane $e_2$. If this adjustment is made, the exposure meter will measure only the light originating from the picture portion $s_2$, which may be assumed to cover from one-tenth to one-twentieth of the surface intersected, in the object plane $e_2$, by the image angle $\alpha$, which is a solid angle. By so adjusting photocell $p$ to the relatively small important portion of the object, in most cases a correct light measurement can naturally be expected, because this important portion of the object will almost always coincide with the area of plane $e_2$ intercepted by the light cone angle $\beta$ of the photocell. Thus, no side light, such as would originate from a bright marginal portion or from a luminous sky, is present to affect the light measurement.

If the object plane is displaced from $e_2$ to $e_1$, after the photocell is re-adjusted as above, the incident light angle $\beta$ thereof will intersect the plane $e_1$ over an area indicated by the portion $s_1$. The surface area of portion $s_1$ has the same ratio to the area of plane $e_1$ intersected by the angle $\beta$ as does the area $s_2$ to the portion of plane $e_2$ intersected by the angle $\alpha$. It is thus not essential that the most important part of the object be located in the middle of the object plane, and the most important part of the picture may just as well be located in any other section of the object plane. A correct light measurement, for proper exposure, will always result if the area of the object plane intercepted by the solid angle $\beta$ coincides with such most important part of the picture.

The aforementioned adjustment of the photocell $p$ can be carried out most effectively in the described manner when the camera is provided with a measuring finder. In such a case, the photocell having a small solid angle of incident light is coupled for movement with the movable element of the measuring finder. Such an arrangement forms the subject matter of my copending application Serial No. 135,600 filed September 1, 1961, which is a division of my said copending application Serial No. 616,247, filed October 16, 1956, and now U.S. Patent No. 3,007,381, issued November 7, 1961. Such a solution is completely satisfactory in practice in most cases. However, in certain cases, as in motion picture photography and telephotography, it is desirable that the light incident on the photocell have a still smaller solid angle, or that light measurements be taken from points outside the field of the measuring finder. Accordingly, in the present invention, an element forming a larger image surface is mounted for pivotal movement in the camera, and a relatively small photocell is arranged for scanning discrete areas of the image surface to measure the light flux of the individual portions of the object.

Figure 5:
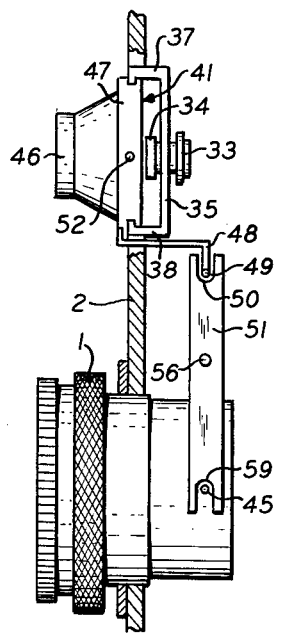
FIGS. 5 and 6 are, respectively, a somewhat diagrammatic sectional view and a somewhat diagrammatic elevational view illustrating a further modification of the invention.
Figure 6:
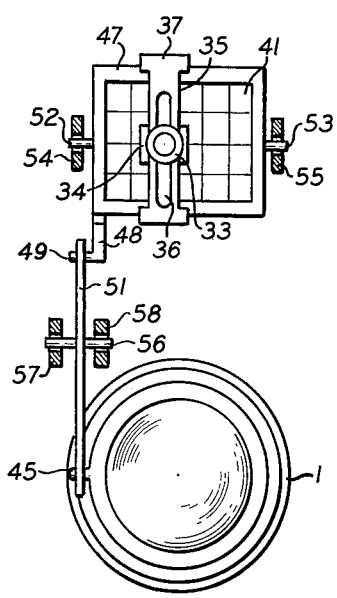

Referring to FIGS. 5 and 6, a lens or lens system 46 forms an image of the objective field included by the image angle of objective 1 on a transparent or translucent image surface 41. This surface 41, which may be a ground glass plate, is mounted in a frame 47. A photocell 34 is mounted behind the image surface 41 with its light sensitive layer directed toward this surface, photocell 34 being so mounted that it can be shifted to any desired portion of the surface 41.

In the arrangement shown in FIGS. 5 and 6, such shifting is effected by a slide 35 having guide wings 37 and 38 engated with the frame 47 so that slide 35 is displaceable horizontally relative to frame 47. Between the wings 37 and 38, slide 35 is formed with an elongated slot 36 in which photocell 34 is guided for vertical displacement. Displacement of photocell 34 is effected through movement of its handle 33.

Frame 47 is provided with pivot pins 52 and 53 disposed in bearings 54 and 55, respectively, which are fixedly mounted in the camera, and has a Z shaped arm 48 extending rearwardly therefrom, a pin 49 being inserted in the free end of arm 48. Pin 49 is engated in the fork 50 of a double-armed lever 51 having a pivot pin 56 intermediate its ends engated in bearings 57 and 58 fixed in the camera. The opposite or lower end of the lever 51 is formed with a second fork 59 in which is engated a pin 45 fixedly mounted on a displaceable part of the objective mount 1. In the position shown in FIGS. 5 and 6, the objective 1 and the exposure meter frame 47 are adjusted to "infinity."

The arrangement of FIGS. 5 and 6 operates as follows. If objective 1 is sharply focused, as by axial displacement along its optical axis, to an object located at a finite distance, the elements 45, 51, 49, and 48 effect a simultaneous swinging of frame 47 in such a manner that the surface 41 and the optical means 46 arranged in front of this surface, together with the photocell 34 located behind the image surface, are directed toward the same surface in the object plane to which the objective 1 is sharply focused. If the user has selected the most important part of the picture to be taken, he can move the handle 33 to shift the photocell 34 to the corresponding portion of the surface 41 and thus measure the light flux of the selected portion of the picture to be taken.

The image formed on the image surface 41 need not be sharp and need not even be observed by the photographer. As sharpness of the image is not important, no special lenses need to be used for the lens system 46 and this system will not even need to be arranged for sharp focusing, thus making the cost of manufacture of such devices very inexpensive. Preferably, an arrangement such as shown in FIG. 4 is used, in which the image appearing in the viewfinder is utilized for scanning the image of the surface 47.

Referring to FIG. 4, the viewfinder screen is indicated at 30 as divided into a grid. A rod 32 is secured to the photocell 34, or preferably to the handle 33 thereof, and extends vertically upwardly therefrom and then laterally into a position behind the viewfinder screen 30. A mark 31 is provided on the free end of the rod 32, and the arrangement of the parts is so selected that the particular portion of screen 30 which has the mark 31 positioned thereover will correspond exactly to the particular portion of screen 41 which is then aligned with the photocell 34. Thus, by observing the viewfinder screen 30, the photographer may manipulate the handle 33 of the photocell 34 to scan any desired area of the image seen in the viewfinder and thus also appearing on the image surface 41. The slide 35 is illustrated as horizontally movable on the guides 39 and 40 which may be upper and lower edges of the frame 47 of FIGS. 5 and 6. The relatively small amount of angular tilting of the frame 47 will not in any manner adversely affect the position of the mark 31 with respect to the viewfinder screen 30.

Figure 7:
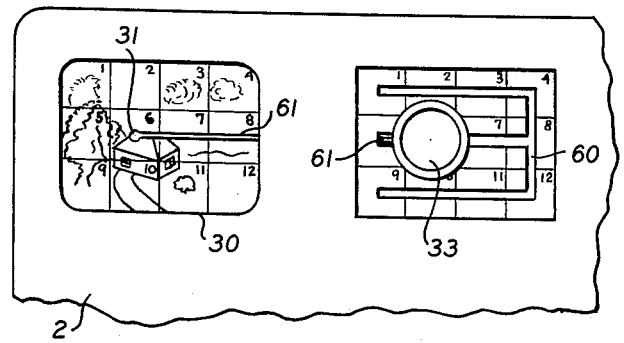
FIG. 7 is a view, similar to FIG. 4, illustrating still another embodiment of the invention.

A modification of this arrangement is shown in FIG. 7. In this modification, the squares formed by the grid marks on the viewfinder screen 30 are numbered, and a correspondingly numbered grid arrangement is provided on the screen scanned by the photocell operable by the handle 33. A fork shaped guide means 60 is provided for the photocell and its operating handle 33, this fork shaped guide means having an arm which is centered over the three squares at the right of the screen, and having three fork "tines" which are centered over each of the other three superposed rows of squares. A thin rod 61 is secured to move with the handle 33 and carries the mark 31 corresponding to the mark 31 of FIG. 4. Thus, by positioning the mark 31 over any one of the numbered squares of the viewfinder screen 30, the photocell associated with the handle 33 will measure the light available on its associated screen and in a square corresponding to that then having the mark 31 positioned thereover. For example, in FIG. 7, the mark 31 is positioned over the square "6" and the photocell operated by the handle 33 is positioned over the square "6" of its associated screen.

A preferred embodiment of the invention, characterized by simplicity of operation, is illustrated diagrammatically in perspective in FIG. 8. With this device, all that is necessary, in order to effect measurement of the light flux of the most important element of the picture, is to operate the manual knob 13 while observing the image in the viewfinder. The objective mount 1 is positioned on a front plate $2a$ of the camera, and plate $2a$ also carries the window 61 of the viewfinder. The film exposure aperture or window 100 is aligned behind the objective mount 1, and a light shaft or passage 62 extends from the window 61 to the eyepiece of the viewfinder (not shown).

A front optical element or means 64 projects through a recess 63 in the plate $2a$, and condenses and focuses light rays incident on the photocell 65. The solid angle of the focused light rays should be small and should intersect, in the object plane, the most important portion of the picture to be taken. Conductors 101 and 102 supply the output current of the photocell 65 to a measuring mechanism or electrical indicator located in casing 103, and whose indication is visible through a window 104. Means other than the particular optical means 64 illustrated may be used for condensing and focusing the light incident on the photocell 65.

Photocell 65 is secured to one end of a rod 66 which passes through a ball 67 intermediate its ends and has a ball 68 on its other end. Ball 68 is engaged in a ball socket 69 and is pressed thereagainst, as by a spring housed in the rod 66 which may be made of a tubular telescoping design. Socket 69 is secured to the upper end of a rod 71 carrying, just below the socket 69, a ballbearing 70, the lower end of the rod 71 being secured to a plate having an opening 72 therethrough. The ball 67 has a bearing support in supports 73 and 74, and the ballbearing 70 has a bearing support in the support 75, the supports 73, 74 and 75 being mounted on a hinge leaf 77 pivoted about a shaft 76 which is fixedly mounted in the camera as illustrated. A rod 79 has one end secured to hinge leaf 77, as at 78, the fastening 78 providing an articulated attachment for the rod 79, and the other end of the rod 79 being joined to the objective mount 1 as indicated at 80. The pull rod 79, acting through the hinge leaf 77, adjusts the photocell 65 in accordance with the displacement of the objective 1 so that the photocell light cone altitude intersects the optical axis of the objective 1 in the particular object plane to which the objective 1 is sharply focused.

Scanning of the photocell 65 so that it will measure the light from the most important part of the object plane is effected by the handle 33 which is rigidly connected by a rod 83 with an angle member 82 within the camera. Rod 83 can be displaced along a slot 84 in the camera cover 2b, as well as being displaceable inwardly and outwardly relative to the camera cover 2b. The angle member 82 is guided by the parallel rod system 85, 86, 87, 88 so that it is movable substantially only parallel to the wall 2a of the camera. The plane of movement of the angle member 82 is so designed that it corresponds to the plane of the viewfinder image. A guiding bracket 89 is provided to further assure proper guiding of the angle member 82 by its parallel rod system, guide bracket 89 being fixedly mounted in the camera.

An angled connecting rod 91 is connected to the angle member 92 and carries, at its free end, the mark 31 cooperable with the finder image viewed in the window 61. A rod 81 is also rigidly secured to the bracket 82 and its free end has an articulated connection in the aperture in the plate 72. It will be observed that, by operating handle 33, the mark 31 can be positioned at any desired portion of the viewfinder image as viewed in the window 61, and that simultaneously the photocell 65 and its light condensing and focusing element 64 are adjusted to the corresponding portion of the area of the object plane intercepted by the image angle of the objective 1.

The proper motion of the photocell essential for correct measurement of the light flux can be attained by proper selection of the length of the lever rods 71 and 66, which rods are universally mounted. Preferably, suitable adjusting means are arranged either on the lever system or on the hinge leaf 77. Adjustment of the angular movement of the photocell can be simply effected by constructing the plate 72 for adjustment relative to the rod 71 and for clamping of the plate 72 in its adjusted position.

While the embodiments of the present invention can be used in all types of cameras, they offer particular advantages when used in camera provided with fully automatic operation under the control of the exposure meter, so that adjustment of exposure factors, such as diaphragm aperture and shutter time, is automatically effected.

While specific embodiments of the invention have been shown and described in detail to illustrate the application of the principles of the invention, it will be understood that the invention may be embodied otherwise without departing from such principles.

What is claimed is:

1. In a photographic camera, an objective including components relatively axially adjustable for focusing of the objective; a photocell arranged to have light incident thereupon through a solid angle which is a minor fraction of the image angle of said objective; an optical system arranged to direct light from the objective field upon said photocell along a ray path independent of the ray path entering said objective; means mounting said optical system and photocell for angular adjustment of the optical axis of said optical system relative to the optical axis of said objective; coupling means interconnecting an axially adjustable component of said objective and said optical system, and effective to angularly adjust said optical system and photocell in accordance with the focusing of the objective so that the axes of the objective and of said optical system intersect substantially in the plane of the sharply focused field of said objective; and means mounting said photocell for movement relative to said sharply focused objective field to scan the light values of discrete areas of the latter.

2. In a photographic camera, as claimed in claim 1, a viewfinder having means providing a field of view corresponding substantially to the image angle of the objective; and an indicator element coupled to said photocell for movement therewith, said indicator element including an indicator mark extending into the field of view of said viewfinder; the position of said indicator mark in the field of view of the viewfinder corresponding, in any position of said photocell, to the discrete area of said sharply focused objective field then being scanned by said photocell; whereby an observer, looking into the viewfinder, may move said photocell to scan the light value of any discrete area of the field of view of the viewfinder.

3. In a photographic camera, an objective including components relatively adjustable axially for focusing of the objective; a translucent screen; an optical system providing an image of the objective field, as included in the image angle of the objective, on said translucent screen, and along a ray path independent of that entering said objective; a photocell mounted for movement over said screen for scanning discrete areas thereof, the incident light angle of said photocell being a minor fraction of the image angle of said objective; means mounting said optical system for angular adjusting of its optical axis relative to the optical axis of the objective; and coupling means interconnecting an axially adjustable component of said objective and said optical system and effective to angularly adjust said optical system in accordance with the focusing of the objective so that the axes of the objective and of said optical system intersect substantially in the plane of the sharply focused field of said objective; whereby said photocell may be moved to scan the light values of discrete areas of said sharply focused field as imaged in said translucent screen.

4. In a photographic camera as claimed in claim 3, a viewfinder having means providing a field of view corresponding substantially to the image angle of the objective; an indicator element coupled to said photocell for movement therewith and including an indicator mark positioned in the field of view of said viewfinder; the position of said indicator mark in the field of view of said viewfinder corresponding, in any position of said photocell, to the discrete area of said sharply focused field then being scanned by said photocell; whereby the observer, looking into the field of view of said viewfinder, may position said photocell to scan the light value of any discrete area of the sharply focused field of the objective.

5. In a photographic camera, an objective including components relatively adjustable axially for focusing of the objective; a viewfinder having means providing a field of view corresponding substantially to the image angle of the objective; a photocell arranged to have light incident thereupon through a solid angle which is a minor fraction of the image angle of said objective; an optical system arranged to direct light from the objective field upon said photocell; means mounting said photocell for movement relative to said sharply focused objective field to scan the light values of discrete areas of the latter; and an indicator element coupled to said photocell for movement therewith and including an indicator mark positioned in the field of view of said viewfinder, the position of said indicator mark in the field of view of said viewfinder corresponding, in any position of said photocell, to the discrete area of said sharply focused objective field then being scanned by said photocell; whereby an observer, looking into the field of view of said viewfinder, may move said photocell to measure the light value of any selected discrete area of said sharply focused objective field.

6. In a photographic camera, an objective including components relatively axially adjustable for focusing of the objective; a viewfinder having means providing a field of view corresponding substantially to the image angle of the objective; a translucent screen; an optical system providing an image of the objective field, as included in the image angle of the objective, on said translucent screen; a photocell mounted for movement over said screen for scanning discrete areas thereof, the incident light angle of said photocell being a minor fraction of the image angle of said objective; and an indicator element coupled to said photocell for movement thereof and including an indicator mark positioned in the field of view of said viewfinder, the position of said indicator mark in the field of view of said viewfinder corresponding, in any position of said photocell, to the discrete area of said screen then being scanned by said photocell; whereby an observer, looking into the field of view of said viewfinder, may move said photocell to scan any selected discrete area of the sharply focused objective field as to light value.

7. In a photographic viewfinder, as claimed in claim 6, said translucent screen being substantially rectangular and corresponding, in area and dimensions, to the field of view of said viewfinder; a slide extending across said screen parallel to one pair of sides of the latter, and mounted for movement in a direction parallel to the other pair of sides of said screen; said slide being longitudinally slotted, and said photocell being adjustable along the slot in said slide whereby, during its scanning movement, said photocell may be moved parallel to either side of said screen for positioning over any part of the total area of said screen.

8. In a photographic camera, as claimed in claim 6, said translucent screen being rectangular and corresponding in area and dimensions to the field of view of said viewfinder; said translucent screen and the field of view of said viewfinder being divided into an equal number of discrete areas arranged in columns and rows respectively parallel to adjacent sides of said screen; a guide providing a first track extending through one column of said areas of said screen, and branch tracks intersecting said first track, each extending longitudinally of a different row of said areas; said photocell being mounted for movement along any of said tracks whereby any of the discrete areas of said screen may be scanned by said photocell.

9. A photographic viewfinder, as claimed in claim 3, in which said screen is mounted in a rectangular frame supporting said optical system; and means pivotally mounting said frame in said camera for pivotal movement about an axis perpendicular to an axial plane through said objective; said coupling means comprising pivotally interconnected linkage interconnecting said frame and said last-mentioned axially adjustable component of said objective.

10. A photographic viewfinder, as claimed in claim 8, including a pair of rails extending along opposite sides of said frame; a slide mounted for movement along said rails and extending across said frame, said slide being formed with a slot extending longitudinally thereof, said photocell being adjustable along the slot of said slide for scanning any selected discrete area of said screen.

11. In a photographic viewfinder, as claimed in claim 1, a support hingedly mounted in said camera for swinging movement in a direction perpendicular to an axial plane of said objective; said coupling means interconnecting said support and said last-mentioned axially adjustable component of the objective; said optical system and said photocell forming a unit mounted on said support for movement therewith; means mounting said unit on said support for universal movement relative to the field of the objective in any position of said support; a viewfinder mounted in said camera and having means providing a field of view corresponding substantially to the image angle of the objective; an indicator element extending substantially parallel to the plane of the field of view of the viewfinder and having an indicator mark movable over said field of view; manually operable means connected to said indicator element for scanning said mark with respect to the field of view of said viewfinder; and linkage interconnecting said indicator element to said unit, and including said universal mounting of said unit, effective to adjust said unit to scan the particular area of the field of view of said objective corresponding to the area of the field of view of said viewfinder then being scanned by said indicator mark; whereby an observer, looking into the field of view of said viewfinder, may, through said manual means, operate said unit so that said photocell measures the light value of the discrete area of the field of view of the objective corresponding to the discrete area of the field of view of said viewfinder then having said indicator mark aligned therewith.

12. In a photographic camera as claimed in claim 11, parallel linkage interconnecting said indicator element and said manual operating means to said unit, whereby said indicator element is moved parallel to the plane of the field of view of said viewfinder during universal adjustment movement of said unit.

References Cited in the file of this patent
UNITED STATES PATENTS

| | | |
|---|---|---|
| 2,796,799 | Strauss | June 25, 1957 |
| 2,990,757 | Ponsar | July 14, 1961 |

FOREIGN PATENTS

| | | |
|---|---|---|
| 746,837 | Great Britain | Mar. 21, 1956 |